United States Patent Office 2,970,823
Patented Feb. 7, 1961

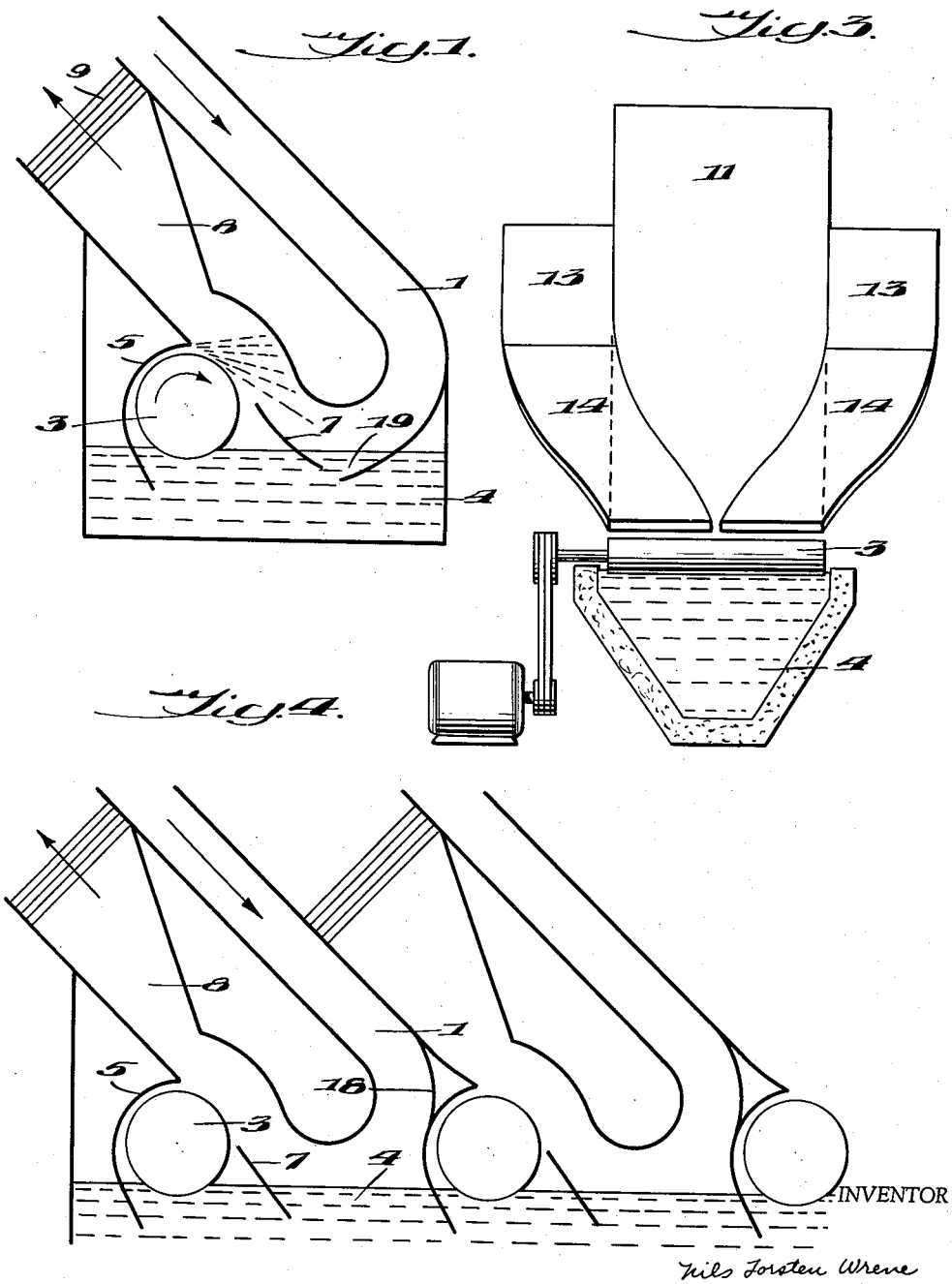

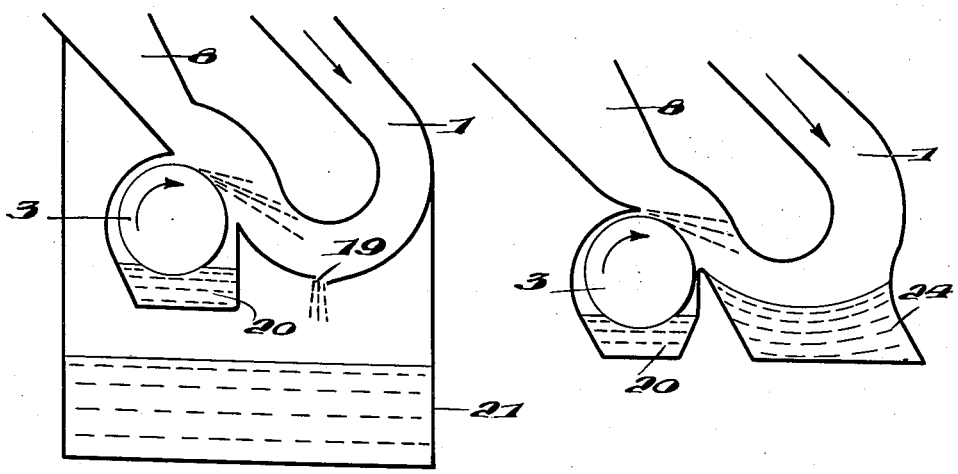
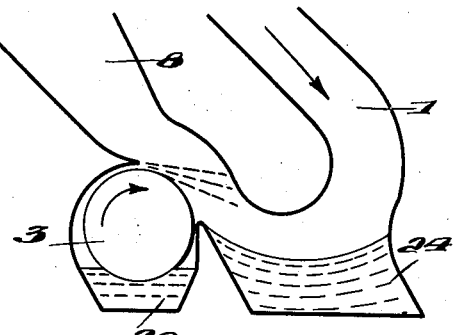
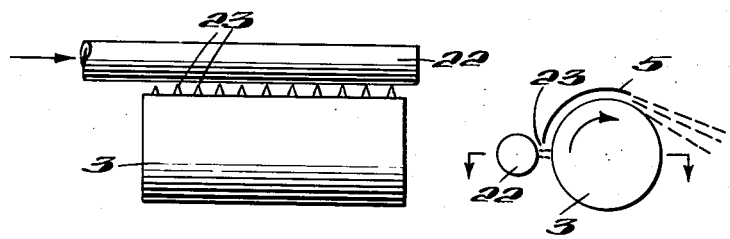
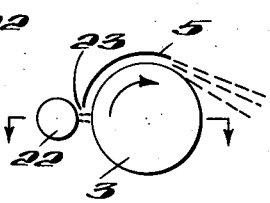
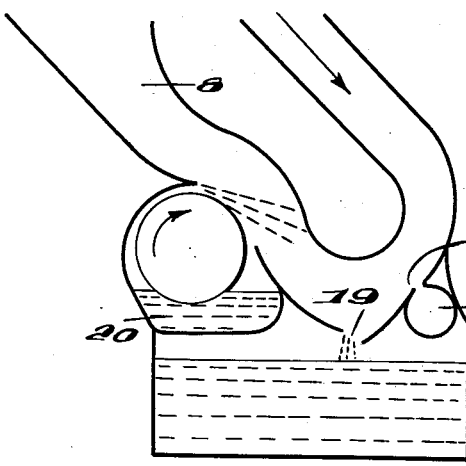

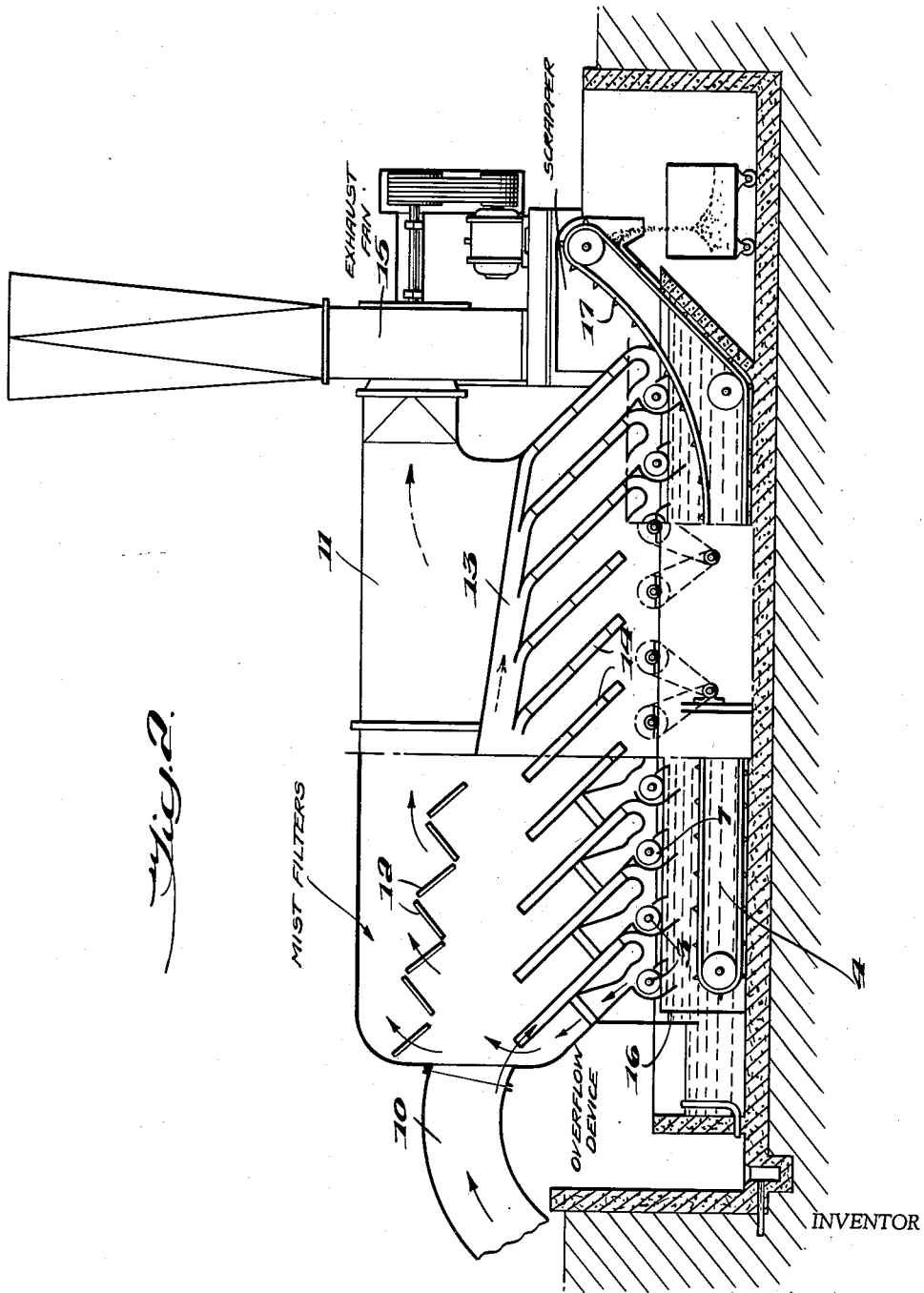

2,970,823

METHOD AND APPARATUS FOR TREATING FLUIDS

Nils Torsten Wrene, Fridhemsgatan 13, Stockholm, Sweden

Filed Oct. 28, 1955, Ser. No. 543,450

Claims priority, application Sweden Nov. 10, 1954

5 Claims. (Cl. 261—92)

Modern hygienics have now advanced so far that efforts are being made to deal simply and effectively with all kinds of impurities in buildings as well as outdoors, not only those which are carried by the ordinary sewage systems, but also airborne and gaseous impurities. In many countries studies of these problems have been made with a view to determining to what degree impurities might be permitted to escape from furnaces, central heating plants and industrial workshops. The nature of gas-borne impurities varies greatly; they may be solid or liquid particles of varying sizes and concentrations, poisonous, corrosive or ill-smelling matter, bacteria, radioactive or explosive substances. Some types of particles, e.g. silicon dust, are injurious if inhaled for any length of time; they may moreover carry electrostatic charges, and the gases may be exceedingly hot. Separation of dust or atomized liquid or gas components may also be required for recovery of materials.

To cope with the ever growing demands, projected plants must be planned for the greatest possible efficacy and reliability, and the removal of all waste must be arranged so as not to interfere with the normal processes of industry. Also, it is undesirable to recirculate air evacuated in the ventilation of work premises, unless it is very effectively purified.

The particles carried by a gas often vary considerably in size, from approximately $0.1\mu$ to 0.5 mm. in diameter, i.e. one may be five thousand times larger than another, which means that the separator must be able to deal with large as well as small particles. So far, only electric filters have been found to meet these demands, but to high costs, and examinations have shown that their purifying results vary with different substances and in some cases also with the relative humidity of the gas, for instance in the extraction of gypsum dust.

Effective purifying plants are of great importance to furnaces, central heating plants, and a multitude of different industries such as cement mills, china and other ceramic factories, foundries, crushing mills of various kinds, lime kilns, paint and chemical plants.

The object of the invention is to provide a new type of plant for separating particles of widely differing sizes and substances from fluids as well as gas components, which is cheap to install and maintain, has small space requirements and give simple and clean removal of the extracted matter.

According to the invention the polluted fluid is made to flow through a continuously curved conduit to obtain stratification of the foregin matter contained therein and thereafter passed through a liquid mist curtain produced by a liquid-fed rotor. In this way also some differentiation of the gas velocity in the curved conduit may be obtained in that the gas velocity near the outer part of the curve is higher, which is favourable to the gas treatment. In some cases it is expedient to release the liquid mist curtain from larger particle sizes by means of one or several openings in the curved part of the conduit before the polluted gas reaches the liquid mist curtain.

In one form, the invention consists of a rotor provided with a curved baffle, in the main parallel to the rotor surface, for directing the liquid curtain created by the rotation, and a conduit into which the liquid curtain enters at an angle opposite to the direction of the fluid flow in said conduit. Experiments have shown that the purifying effect is increased in this way, more especially if the relative velocity of the gas and the drops of liquid is great, between 30 and 60 metres/second. In this way the particles will meet the drops and be effectively assimilated or bounce off in various directions when they collide, in which case they will agglomerate into larger units. With a view to improving its directing effect the curved baffle is so disposed in relation to the rotor surface that its distance from said surface diminishes towards the slit through which the liquid is projected. It is expedient to have the fluid conduit curved back on itself—preferably through an angle of 180°—before it reaches the slit through which the liquid curtain emerges; any coarse particles will then be flung outwards by centrifugal force and carried away, through an opening in the conduit, to a receptacle which may also be filled with liquid. Both parts of the curved-back conduit are suitably set at an angle of, say, 45° to the surface of the liquid.

It may be pointed out that the desired effect of the curved part of the gas conduit is based on smooth flow of the gas. It is therefore important to avoid abrupt changes of the gas flow around sharp edges, etc.

One particularly important feature of the invention is that a plurality of these purifying units may be incorporated in a plant using a common tank or system of conduits for the liquid to remove the sludge. In one form the rotors are partly immersed in the same liquid and the system has therefore level control arrangement.

The invention will now be described, by way of example, with reference to the accompanying drawings, in which:

Figure 1 shows a purifying unit according to the invention,

Figure 2 shows a plant in which a number of units as shown in Fig. 4 are combined and Figures 3 and 4 show transverse and longitudinal sections respectively of details of a purifying plant.

Figures 5 and 6 show alternative manners of feeding liquid to the rotor,

Figure 6a is an end view of structure shown in Figure 6.

Figures 7 and 8 illustrate alternative manners of removing heavier particles or components by liquid in the curved part of the conduit, and Figure 8 also shows a gas conduit with two openings, one of which allows very coarse particles to leave the conduit in order to avoid sediments if the waste liquid is taken directly to the common sewage system.

The same reference numbers are used in all the figures.

Figure 1 shows an apparatus suitable for practical use. The conduit 1, curved back by 180°, is set at an angle of 45° to the surface of the liquid 4. In front of the rotor is a protecting baffle 7 to prevent the gas from passing underneath the roller. This baffle leaves an opening 19 affording free passage to the water tank for the heavier particles. Behind the slit through which the liquid curtain is projected the conduit 8 is widened to increase the static pressure of the gas and to obtain a condensation effect. Following this widened part is a baffle-type filter system 9 for removing droplets of liquid. The normal velocity of both gas and liquid should be about 20 metres/second.

Figures 2, 3 and 4 show a larger capacity plant consisting of a number of units of the type described above following one another, with two inlet pipes 10 and one outlet pipe for the gas. One or more inlet pipes may of course be provided, according to the number of exhaust systems used, each of which could have separate shut-off devices. The outgoing gases collect in a gas-collecting conduit fitted with extra mist filters 12 above the rotors and leading to the exhaust fan 15. Microscopic particles that may have passed the droplet removing filter may form nuclei for liquid vapour condensation in the free space below the mist filters, in which the condensates will then be caught. Two conduits 13, one on each side of the outlet conduit 11, distribute the incoming gas to the rotors 3 by S-shaped conduits 14, one from either side to each rotor. As the whole device is under a slight vacuum (at least 80 mm. of water) from the exhaust fan 15, there will be no leakage of gas. The liquid in the common tank in which the rotors are rotating is kept at a constant level by means of an overflow 16. Any sludge collecting at its bottom is removed by a scraper device 17.

Figure 5 shows an embodiment of a purifying unit in which the rotor is fed with liquid by means of a conduit 20 for liquid and the liquid level in the receptacle 21 is lower than the opening 19 in the gas conduit. In this way the rotor may be fed with cleaner liquid than that in the receptacle.

Figure 6 shows an arrangement to feed the rotor by means of a pipe 22 for liquid provided with a series of holes 23 directing the liquid against the rotor surface. In this case the rotor axis must not be horizontal.

Figure 7 shows another embodiment of a purifying unit in which the rotor is provided with a conduit 20 for liquid and the curved part of the gas conduit is fed by a separate conduit 24 for liquid. The figure shows the liquid level when the gas is passing the curved part of the conduit. This embodiment is especially adapted when great quantities of dust are to be removed.

Figure 8 shows a purifying unit with another opening 25 for letting out the very coarse particles in dry state to a special conduit 26.

The atomization, density and velocity of the liquid curtain can be regulated to maximum purification effect by varying the water level and the rotational speed of the rotors.

In large plants with a liquid tank, which carries the rotor bearings, the tank is most suitably built as a supporting structure, for example of concrete. When there are different systems for the rotor liquid and the sludge removal liquid and the liquid level is not the same in both systems it is to be preferred to use liquid conduits of sheet metal. The choice of materials for the other parts of the units, which support only their own weights, is optional as long as due attention is paid to the wearing or corroding properties of the polluted gas. If this is corrosive, the top part of the unit may be made of or coated with plastic material such as polyvinylchloride.

Apparatus as described above can also be used for extracting water-soluble gases or particles from a gas, or for producing chemical reactions of particles or gaseous substances to some liquid. The liquid treatment will also effectively neutralize any static electric charges and/or remove any particles so charged.

A similar arrangement can also be used for deodorization by adding for instance some sodium hypochlorite to the rotor liquid. This is useful in the manufacture of fertilizers or bone or horn glue-stock, and in plants for dealing with restaurant and abattoir waste. The device described may also be used in a reversed manner for example in adding some component to the fluid by means of evaporating from the liquid mist curtain.

Speaking generally, the possibility of combining by means of these units several separate exhausts into one large plant, with consequent technical and economic advantages, affords many industries a chance of effecting rationalizings. Good examples of how several exhausts can be combined in a common separating unit are the ventilation plants in foundries, where exhausts of smokes and dusts are required from operations or processes as varying as smelting, sand preparation, core drying, casting, cooling, tapping, sand-cooling, coarse grinding, polishing, sand-blasting, etc. from which the neighbourhood is to be protected. Naturally, there are many other industries in which this means of rationalizing their purifying problems might be adopted.

What I claim is:

1. Apparatus for obtaining effective contact between a gaseous stream and liquid mist particles comprising a gas conduit having laterally-spaced first and second substantially straight sections joined by an intermediate curved section having a continuously curved inner wall, said gaseous stream being conducted successively through said first straight section, through said intermediate curved section, and through said second straight section, said first and second straight sections having adjacent inner walls and also having outer walls opposite said inner walls, the outer wall of said second substantially straight section having an opening therein adjacent said curved section, and means for feeding a liquid spray through said opening into said second section in directions varying from transverse to opposed to the direction of flow of the gaseous stream through said gas conduit comprising a rotor adjacent said opening and having an axis of rotation outside said gas conduit and substantially parallel to the axis of curvature of the curved inner wall of said curved intermediate section, said rotor being rotatable in a direction to cause the peripheral portion thereof adjacent said opening to rotate toward said curved intermediate section, and means for feeding a liquid to said rotor for introduction thereby in the form of a liquid spray through said opening into said second substantially straight section, whereby the heavier solid particles of the gaseous stream are directed into the densest and highest velocity portion of the spray.

2. Apparatus as defined in claim 1 wherein the surface of the portion of the inner wall of said second substantially straight section directly opposite and facing the opening in the outer wall contains a concave recess therein.

3. Apparatus as defined in claim 1 wherein said second substantially straight section of said gas conduit terminates in a widened portion to cause increase of the static pressure of the gaseous mixture.

4. Apparatus as defined in claim 1 wherein a portion of the curved section of the gas conduit comprises the surface of a liquid contained in a separate liquid conduit.

5. A device for obtaining effective contact between a gaseous fluid and liquid particles comprising a gas conduit of generally rectangular cross-section and having a continuously curved section connected at one end to a straight section, said gaseous fluid being conducted successively through said curved section and through said straight section, said curved section having oppositely arranged curved inner and outer walls of lesser and greater radii of curvature, respectively, said straight section having oppositely arranged first and second walls connected to said inner and outer curved walls, respectively, said second wall having an opening therein adjacent the point of connection to said curved outer wall, a liquid-fed rotor outside said conduit and adjacent the opening in said second wall, the axis of rotation of said rotor being generally parallel to the axis of curvature of said curved section, and a curved baffle partially surrounding and spaced from the periphery of said rotor, the axis of curvature of said baffle being parallel to the axis of rotation of said rotor, said baffle being connected at one end to one edge of said opening to cause a liquid spray curtain generated by the rotation of said rotor to be projected into said conduit through said opening, whereby the heavier solid particles of the gaseous fluid are directed into the densest and highest velocity portion of the spray.

References Cited in the file of this patent

UNITED STATES PATENTS

| | | |
|---|---|---|
| 227,342 | Alberger et al. | May 11, 1880 |
| 1,609,611 | Dovel | Dec. 7, 1926 |
| 2,050,797 | Kerschbaum et al. | Aug. 11, 1936 |
| 2,163,452 | Schmieg | June 20, 1939 |
| 2,257,516 | Roche et al. | Sept. 30, 1941 |
| 2,365,483 | Mode | Dec. 19, 1944 |
| 2,468,607 | Schneible | Apr. 26, 1949 |
| 2,471,724 | Christensen | May 31, 1949 |
| 2,642,152 | Dohrer | June 16, 1953 |

FOREIGN PATENTS

| | | |
|---|---|---|
| 149,276 | Sweden | Mar. 22, 1955 |
| 827,796 | Germany | Jan. 14, 1952 |

UNITED STATES PATENT OFFICE
CERTIFICATE OF CORRECTION

Patent No. 2,970,823                            February 7, 1961

Nils Torsten Wrene

It is hereby certified that error appears in the above numbered patent requiring correction and that the said Letters Patent should read as corrected below.

Column 4, lines 37 and 75, strike out "solid", each occurrence.

Signed and sealed this 12th day of September 1961.

(SEAL)
Attest:

ERNEST W. SWIDER
Attesting Officer

DAVID L. LADD
Commissioner of Patents

USCOMM-DC